No. 657,382.  
G. S. BARTLETT.  
BICYCLE.  
(Application filed Mar. 16, 1900.)
Patented Sept. 4, 1900.
(No Model.)
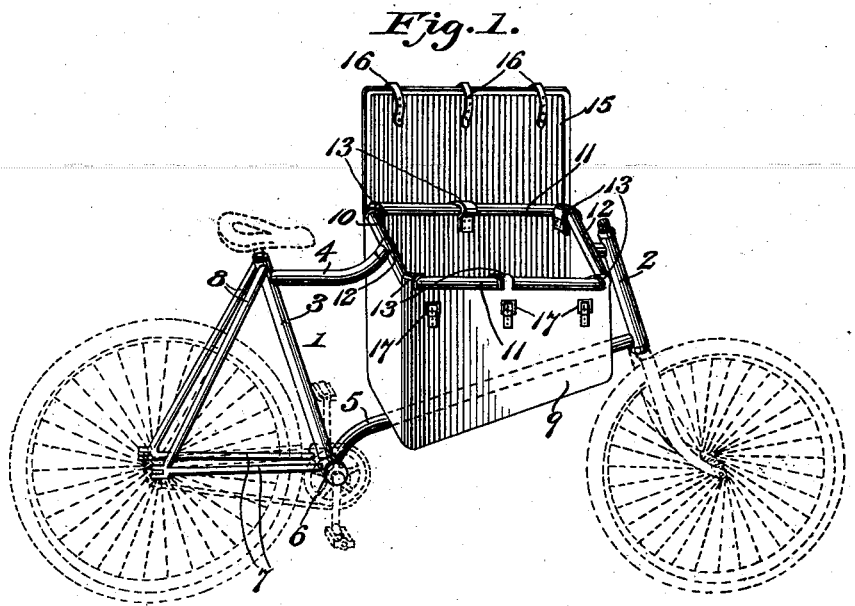
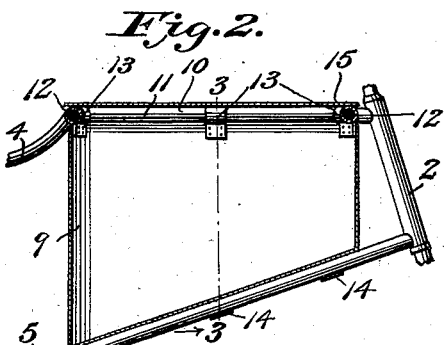
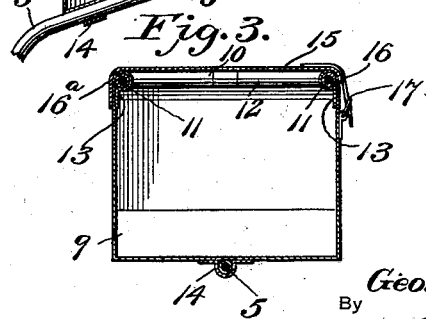
Witnesses  
Edwin G. McKee  
George S. Bartlett  
Inventor  
By  
Attorney

UNITED STATES PATENT OFFICE.

GEORGE S. BARTLETT, OF BOISE, IDAHO.

BICYCLE.

SPECIFICATION forming part of Letters Patent No. 657,382, dated September 4, 1900

Application filed March 16, 1900. Serial No. 8,934. (No model.)

*To all whom it may concern:*

Be it known that I, GEORGE S. BARTLETT, a citizen of the United States, residing at Boise, in the county of Ada and State of Idaho, have invented a new and useful Bicycle, of which the following is a specification.

This invention relates to bicycles or similar vehicles, and has special reference to the frame structure thereof, to provide a construction which greatly increases the carrying capacity of the vehicle.

To this end the invention primarily contemplates an improved construction of frame for bicycles and the like having means for supporting a bag or receptacle that may be utilized for carrying luggage of any character, thereby adapting the machine or vehicle for use in package-delivery for cycle tourists and analogous purposes.

A further object of the invention is to provide for supporting the bag or receptacle in a well-balanced position and so arranged as to uniformly distribute the load upon the frame of the machine, thus obviating undue strain upon any particular part of the machine and at the same time not disturbing the true balance thereof.

With these and other objects in view, which will more readily appear as the nature of the invention is better understood, the same consists in the novel construction and arrangement of parts hereinafter more fully described, illustrated, and claimed.

The essential features of the invention are necessarily susceptible to some modification without departing from the spirit thereof; but the preferred embodiment of the improvement is shown in the accompanying drawings, in which—

Figure 1 is a perspective view of a bicycle of the sprocket-and-chain driving type, the frame of which is constructed in accordance with the present invention. Fig. 2 is a longitudinal sectional view of the portions of the frame associated with the pendent carrying bag or receptacle. Fig. 3 is a cross-sectional view on the line 3 3 of Fig. 2.

Like numerals of reference designate corresponding parts in the several figures of the drawings.

In carrying out the invention the improved frame structure may be applied to any type of bicycle or similar vehicle irrespective of the particular driving mechanism thereof; but for illustrative purposes there is shown in the drawings a bicycle of the ordinary sprocket-and-chain type. This machine includes the frame 1, carrying the usual front and rear wheels and preserving the outlines of the well-known diamond bicycle-frame, the same essentially comprising the head-tube 2, the inclined seat-post tube 3, the upper frame-bar 4, extending from the upper end of the seat-post tube to the corresponding end of the head-tube, the lower reach-bar 5, extending from the crank-hanger 6 at the lower end of the seat-post tube to the lower end of the head-tube, the rear fork 7, and the rear inclined braces 8, connecting the rear fork or forks with the seat-post tube. These are the usual members of a bicycle-frame; but in carrying out the invention the frame structure is materially modified between the seat-post tube and the head-tube to provide for the support of the bag or receptacle 9 in the space between the upper frame-bar and the lower reach-bar 5. To secure this desirable result, the upper frame bar or frame member 4 has joined thereto as an integral part of the complete frame a horizontally-arranged open supporting-rim 10. This rim is in the form of an annulus and is preferably of a rectangular shape, although it is obvious that a circular or other configuration may be given to the said rim without materially affecting the invention. In the preferred embodiment, however, the said open supporting-rim 10 is of a rectangular shape and consists of the opposite parallel side bars 11 and the end cross-bars 12, the latter being joined, respectively, to the front and rear sections of the upper frame-bar 4 of the machine-frame, and at this point it will be observed that the rear section of the said upper frame-bar 4 is somewhat bowed, so as to brace and sustain the open supporting-rim portion 10 at a suitable elevation for holding a carrying bag or receptacle 9 of a maximum size. The open supporting-rim constituting a part of the bicycle-frame proper projects an equal distance at opposite sides of the vertical plane of the machine-frame and is designed to have suspended therefrom a carrying bag or receptacle 9, made of leather, canvas, or other suitable material and connected at its upper edges by means of attaching-loops 13 or equivalent connections with the side and end portions of the said rim 10. The said carrying bag or receptacle may be of any suitable shape, but is preferably of a cubical form, with the bottom thereof inclined to correspond with the inclination of the lower reach-bar 5 and secured directly thereto by the bracing-loops 14, which prevent lateral shifting of the bag or receptacle and hold it in position between the upper and lower portions of the bicycle-frame. The carrying bag or receptacle 9 is open at the top, and by reason of the open formation of the supporting-rim 10 the bag is necessarily provided with an unobstructed mouth, so that articles of the size of the supporting-rim can be introduced into the bag or receptacle and removed therefrom.

Any suitable means for holding the bag or receptacle in place may be resorted to, and it is preferable in the construction of the device to associate with the same a lid or cover 15, which is hinged at one edge, as at 16$^a$, to the top edge of the bag or receptacle, at one side thereof, or directly to the supporting-rim, and provided at its swinging edge with the straps 16, adapted to engage with the fastening-buckles 17, fitted to one side of the bag or receptacle on the exterior thereof. In this connection it should be observed that the inclined bottom of the bag or receptacle 9 rests flat upon the lower inclined reach-bar of the frame, and is thereby firmly braced and supported in position, while the lid or cover 15 when closed over the open mouth of the bag or receptacle rests directly upon the opposite parallel side bars 11 of the supporting-rim 10, and is thereby firmly sustained in position and prevented from sagging inwardly, while at the same time being held in a plane so as to not be in the way of the rider who reaches over the bag or receptacle to grip the handle-bar.

From the foregoing it is thought that the construction and many advantages of the herein-described carrier-bicycle will be readily apparent to those familiar with the art without further description, and it will be understood that various changes in the form, proportion, and minor details of construction may be resorted to without departing from the principle or sacrificing any of the advantages of this invention.

Having thus described the invention, what is claimed as new, and desired to be secured by Letters Patent, is—

A bicycle-frame, of the single diamond form, having its upper frame-bar, between the head-tube and the seat-post thereof, provided with an integral horizontal open supporting-rim projecting equidistant at opposite sides of the vertical plane of the frame, said upper frame-bar having a short section extending from the rear side of the said open rim to a point of lower elevation on the seat-post to constitute a bracing-strut for the said rim, a carrying bag or receptacle interposed between the open rim and the lower inclined reach-bar of the frame, and having an inclined bottom portion resting flat upon the said inclined reach-bar, fastening connections between the top edge of the bag or receptacle and the rim, separate fastening connections between the bottom of the bag or receptacle and the reach-bar to prevent lateral displacement of the bag or receptacle, and a cover hinged at one side of the rim and arranged in its closed position to rest directly upon the opposite side bars of the said rim, substantially as set forth.

In testimony that I claim the foregoing as my own I have hereto affixed my signature in the presence of two witnesses.

GEORGE S. BARTLETT.

Witnesses:
A. S. BIBBINS,
W. S. BRUCE.